United States Patent [19]

Tults

[11] Patent Number: 5,463,423
[45] Date of Patent: Oct. 31, 1995

[54] AUXILIARY VIDEO DATA DETECTOR AND DATA SLICER

[75] Inventor: Juri Tults, Indianapolis, Ind.

[73] Assignee: Thomson Consumer Electronics, Inc., Indianapolis, Ind.

[21] Appl. No.: 850,200

[22] Filed: Mar. 11, 1992

[51] Int. Cl.$^6$ .................................................. H04N 7/08
[52] U.S. Cl. ........................ 348/465; 348/478; 375/317
[58] Field of Search ................................. 358/142, 147, 358/146; 348/461, 464, 465, 473, 476, 478, 479; 307/351, 358, 359, 354; 328/115; 375/76; H04N 7/08, 7/04, 7/087

[56] References Cited

U.S. PATENT DOCUMENTS

| | | | |
|---|---|---|---|
| 4,358,790 | 11/1982 | Summers | 375/76 |
| 4,577,227 | 3/1986 | Gurumurthy | 358/142 |
| 4,585,989 | 4/1986 | Matney | 307/359 |
| 4,620,227 | 10/1986 | Levin et al. | 358/142 |
| 4,707,740 | 11/1987 | Stratton | 358/153 |
| 4,794,626 | 12/1988 | Tanabe et al. | 358/148 |
| 4,931,870 | 6/1990 | den Hollander | 358/142 |
| 5,136,382 | 8/1992 | Meyer | 358/147 |
| 5,223,930 | 6/1993 | Zato | 358/146 |

FOREIGN PATENT DOCUMENTS

| | | | |
|---|---|---|---|
| 59-4283 | 1/1984 | Japan | 358/147 |
| 215182 | 9/1988 | Japan | H04N 7/08 |

OTHER PUBLICATIONS

Panasonic Preliminary Information Micro with Caption Decoder; Mar. 14, 1991; pp. 1-1 through 1-4, and 2-1 and 2-6.

*Primary Examiner*—James J. Groody
*Assistant Examiner*—Chris Grant
*Attorney, Agent, or Firm*—Joseph S. Tripoli; Peter M. Emanuel; Robert D. Shedd

[57] ABSTRACT

A data slicer for extracting auxiliary video data from a video signal adapts a data slicing level to the amplitude of the data signal as indicated by the average value of a run-in clock (RIC) signal that is included in the video signal. Control of the slicing level occurs during a window interval that spans a portion of the RIC signal. A comparator compares the video signal to a slicing level established at the output of a digital to analog converter. A digital system monitors the output of the comparator during the RIC window to determine both the existence of auxiliary video data and the accuracy of the slicing level. The slicing level is adjusted in response to the comparator output to establish a slicing level related to the RIC signal amplitude.

20 Claims, 6 Drawing Sheets

AUXILIARY VIDEO DATA DETECTOR AND DATA SLICER

FIELD OF THE INVENTION

The present invention relates to detection of information that may be present in a video signal during blanking or overscan intervals.

BACKGROUND OF THE INVENTION

A video signal typically includes vertical display intervals, or fields, having a plurality of horizontal line intervals, e.g. 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert auxiliary information, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR §§ 15.119 and 73.682) specifies that digital data corresponding to ASCII characters for closed captioning must be in line 21 of field 1.

The first step in extracting auxiliary video information is to locate the auxiliary information. Various approaches may be used depending on the type of information involved. For example, recognition of teletext data characteristics such as the framing code pattern is a method of locating teletext data. A first step to locating closed caption information is to identify line 21 of field 1. One approach is to count video lines by counting horizontal sync pulses. Examples of line counting approaches may be found in pending International Patent Applications PCT/US/92/04825 and PCT/US/92/04826, filed on 15 Jun. 1992, published on 21 Jan. 1993 (International Publication Numbers WO 93/01680 and WO 93/01681, respectively), and assigned to the assignee of the present application.

After the auxiliary video information is located, the information must be extracted. In the case of digital data, a "data slicer" may be used to convert the video signal into binary data. A data slicer typically operates by comparing the video signal level to a reference level known as the slicing level. For video levels that exceed the slicing level, the comparison produces a logic 1. Video levels that are less than the slicing level produce a logic 0. As an example, closed caption data in line 21 of the video signal may exhibit a signal amplitude range of 0 IRE to 50 IRE. For a signal range of 0 IRE to 50 IRE, a slicing level of 25 IRE would be appropriate.

A constant slicing level may not be adequate for all video signals. Video signal levels may vary depending on the source of the video signal. Utilizing a constant slicing level with varying video signal levels may bias the extracted data undesirably toward logic 0 or logic 1 resulting in erroneous data extraction. For example, if the video signal range is 0 IRE to 20 IRE rather than 0 IRE to 50 IRE, a slicing level of 10 IRE rather than 25 IRE is desirable. If 25 IRE were used as a slicing level for a signal range of 0 IRE to 20 IRE, a logic 1 would never be extracted because the signal never exceeds the slicing level. Thus, it is desirable to adapt the slicing level to the amplitude of the input video signal.

Another possible problem with a constant slicing level is that the operating parameters of components used in a data slicer may vary as a function of temperature, supply voltage, or manufacturer. As an example, characteristics of integrated circuit voltage comparators may vary as a result of temperature and supply voltage changes or different integrated circuit fabrication techniques causing the switching threshold to change. If the amplitude of an auxiliary video data signal is low, changes of component switching thresholds with respect to a fixed slicing level might significantly decrease the accuracy of data extraction. It may be desirable, therefore, to adapt the slicing level to compensate for component variations.

The signal format of auxiliary video data such as closed caption data includes provisions to facilitate an adaptive slicing level function. As specified in the FCC standards, a closed caption signal in line 21 begins after the "back porch" interval of the video signal with a 7 cycle burst of a sinusoidal reference waveform designated the "run-in clock" (RIC). The RIC reference component of the auxiliary video data signal is followed in the latter half of the line 21 interval by a data signal component that represents the actual closed caption data. The closed caption data standard establishes that the amplitude of the RIC signal is identical to the amplitude of the data signal. Thus, the average of the RIC signal amplitude is an appropriate slicing level for the subsequent data signal.

Auxiliary data such as closed-caption data may not exist in all video signals. For example, switching between different video sources may result in switching from one signal having closed caption data to another source that does not. If no auxiliary video data exists, there will be no RIC signal to serve as the basis for modifying the slicing level. Attempting to adapt the slicing level without a RIC signal may produce an inaccurate slicing level.

Another possible problem with certain types of adaptive slicing level systems is that an extended interval (e.g. 1 second) may be required to complete slicing level adjustment. A long slicing level adjustment period may cause an objectionable loss of auxiliary video data while the slicing level is being modified.

SUMMARY OF THE INVENTION

A data slicer for extracting auxiliary video data from a video signal adapts a data slicing level to the amplitude of the data signal as indicated by the average value of a run-in clock (RIC) signal that is included in the video signal. Control of the slicing level occurs during a window interval that spans a portion of the RIC signal. A comparator compares the video signal to a slicing level established at the output of a digital to analog converter. A digital system monitors the output of the comparator during the RIC window to determine both the existence of auxiliary video data and the accuracy of the slicing level. The slicing level is adjusted in response to the comparator output to establish a slicing level related to the RIC signal amplitude.

DETAILED DESCRIPTION OF THE DRAWING

Figure 1:
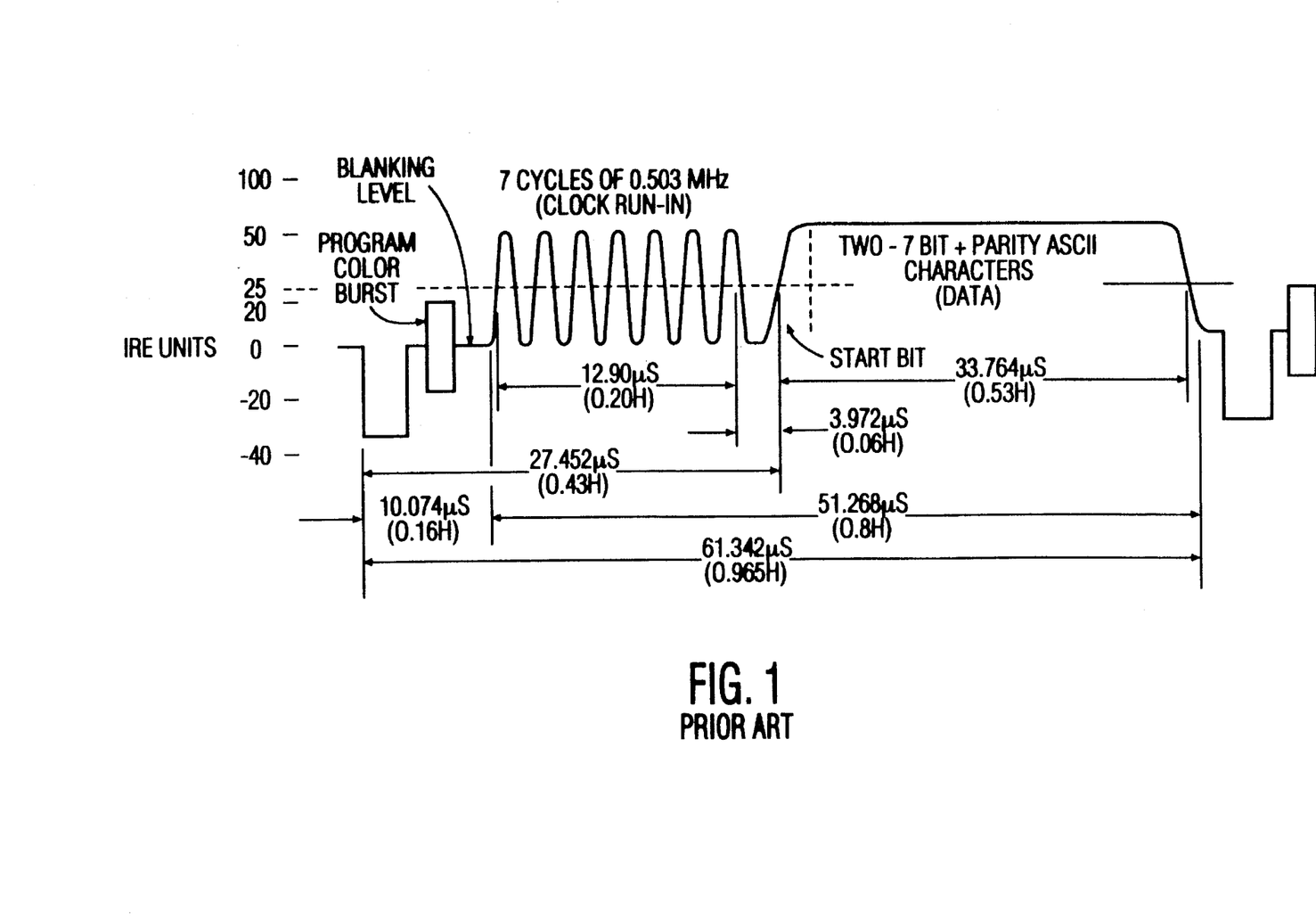
FIG. 1 shows an example of an auxiliary video data waveform.

The operation of an exemplary embodiment of the invention shown in FIGS. 2 and 2a will be explained in the context of closed caption data that complies with the FCC standard (see e.g. 47 CFR §§ 15.119 and 73.682) closed caption signal depicted in FIG. 1. As discussed further below, the invention may also be applicable to the extraction of other forms of auxiliary video data such as teletext.

Figure 2:
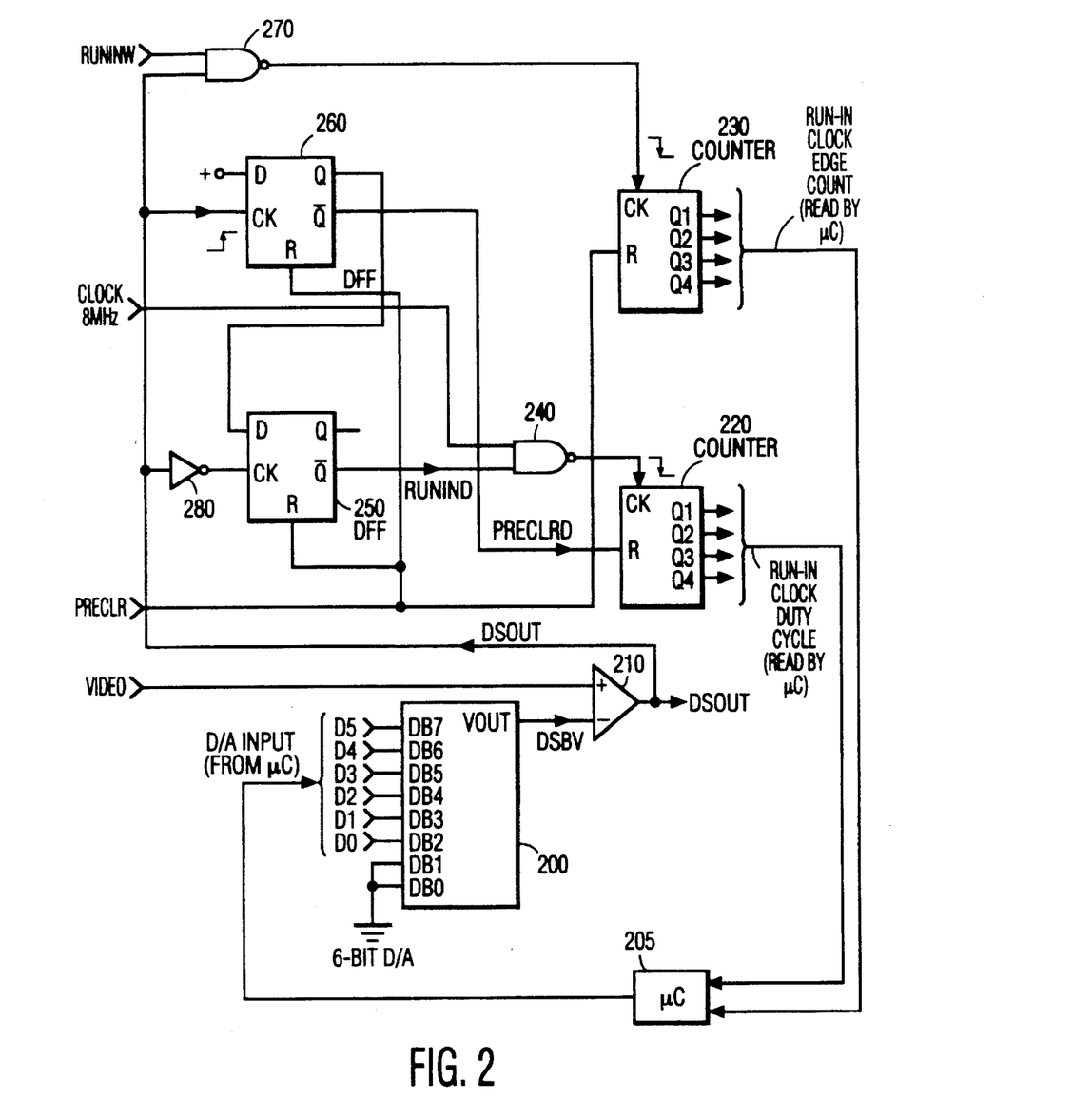
FIGS. 2 and 2a show, partially in block diagram form and partially in schematic form, an embodiment of the invention.
Figure 2A:
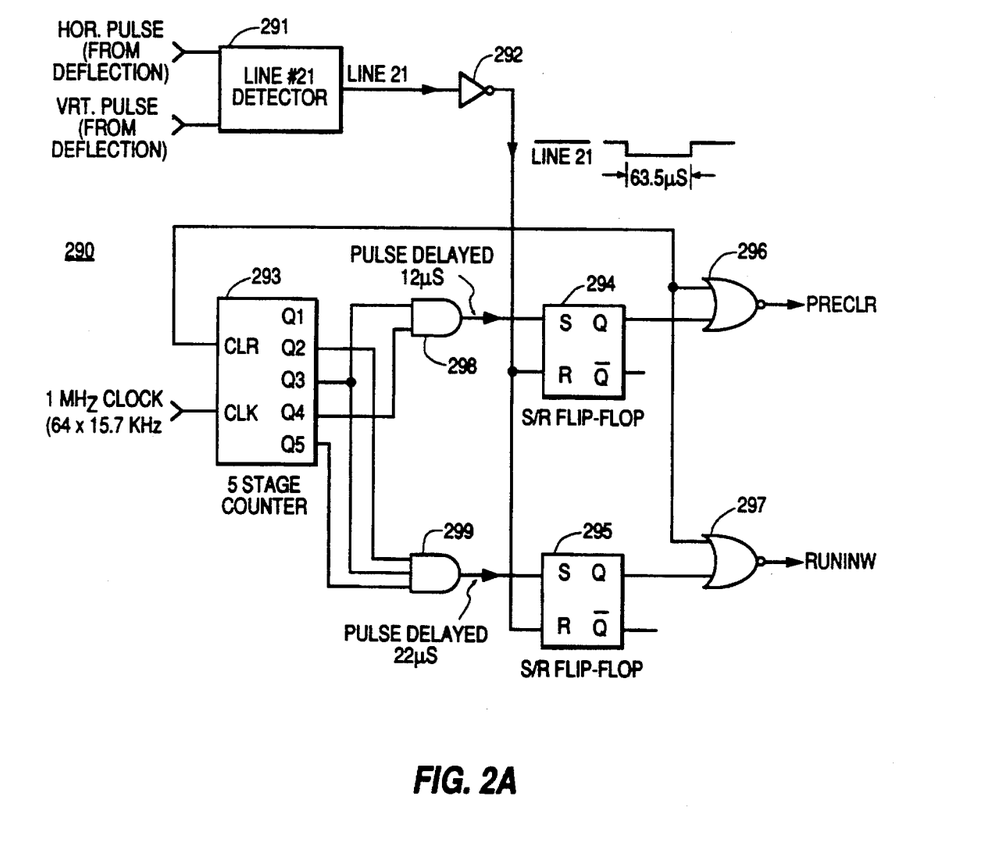

A control signal generator (hereafter control logic) generally designated 290 is shown in FIG. 2a. The circuitry of control logic 290 generates a signal designated PRECLR and a signal designated RUNINW which are applied to the circuitry of FIG. 2. A television line 21 detector 291 receives horizontal and vertical pulses from the deflection circuitry (not shown), and produces a signal (LINE 21) indicative of the presence of line 21. Signal LINE 21 is true for approximately 63.5 microseconds. Signal LINE 21 is inverted by an inverter 292 to produce a low-going signal LINE 21-BAR which is then applied to the clear input of 5-stage counter 293, thereby enabling counter 293 for counting transitions of a 1 MHz clock applied to its clock input.

Signal LINE 21-BAR is also applied to the reset inputs of a pair of set-reset (S-R) flip-flops 294 and 295 which enables those flip-flops to be set by the next high level signal applied to their respective set inputs during the low period of signal LINE 21-BAR. Signal LINE 21-BAR is also applied to one input of a pair of NOR-gates 296 and 297 which enables those gates during the low period of signal LINE 21-BAR.

In operation, at the onset of line 21, flip-flops 294 and 295 are reset. Thus NOR-gates 296 and 297 each receive low level signals at both inputs, causing signals PRECLR and RUNINW to go high (see also FIG. 3 (D) and (E)). At the same time, counter 293 begins to count transitions of its 1 MHz clock. When the count reaches 12 (i.e., a delay of 12 microseconds), AND gate-298 produces a pulse which sets flip-flop 294 and terminates signal PRECLR. When the count of counter 293 reaches 22 (i.e., a delay of 22 microseconds), AND-gate 299 produces a pulse which sets flip-flop 295 and terminates signal RUNINW.

The system depicted in FIG. 2 includes 6-bit digital to analog converter (DAC) 200. Although a 6-bit digital signal is shown, other digital bit widths could be used if more or less resolution is desired. The function of DAC 200 may be provided by, for example, a DAC such as AD558 manufactured by Analog Devices. The AD558 is an 8-bit DAC but may be used with a 6-bit input as shown in FIG. 2 if the two least significant bits are coupled to logic 0. The 6-bit digital input to DAC 200 (D7—D2) is supplied by control microcomputer (μC) 205.

The analog output of DAC 200 provides slicing level DSBV that is coupled to one input of comparator 210. The function of comparator 210 may be provided by an integrated circuit comparator such as LM339 from National Semiconductor. The other input of comparator 210 is coupled to input video signal VIDEO. The comparator provides an output signal DSOUT that represents a digital representation of the levels in signal VIDEO. Levels in signal VIDEO that exceed and are less than slicing level DSBV will be represented by logic 1 and logic 0 values, respectively, in signal DSOUT.

Signal DSOUT is coupled to data processing logic (not shown in FIG. 2) that is timed to operate with respect to auxiliary video data in signal VIDEO such that auxiliary video data in signal DSOUT is stored and displayed (e.g. on a cathode ray tube in a television receiver) as required. Signal DSOUT is also coupled to control logic including logic elements 220 through 280 in FIG. 2. The control logic functions may be implemented using standard CMOS or TTL logic family elements. As shown in FIG. 2, counters 220 and 230 are 4 bit counters. The control logic outputs are coupled to the control μC. As described below, the control μC evaluates data from the control logic and adjusts the slicing level to a desired value by modifying the input to DAC 200.

The first task performed by the system shown in FIG. 2 is to confirm the presence of a closed caption signal. This is accomplished by the control μC executing a routine shown in the flowchart in FIG. 4. First, the control μC initializes the slicing level at step 400 to a value exceeding the maximum expected amplitude of the RIC signal. This initial slicing level insures that initially the RIC signal will not produce pulses on signal DSOUT. The system then waits at step 410 until the expected location of the auxiliary video data, e.g. line 21, field 1, for closed caption data is detected. Next, control logic 290 defines control signals RUNINW and PRECLR at step 420 such that counter 230 is enabled as described below for an approximately 10 μs wide window W1 (see FIG. 3E) centered about the RIC waveform (see FIG. 3A).

FCC specifications for closed caption data (see e.g. 47 CFR §§ 15.119 and 73.682) dictate that 7 cycles of a 503 kHz RIC waveform will occur within a RIC signal interval beginning approximately 10 μs after the falling edge of horizontal sync. This timing is shown in FIGS. 1 and 3. The duration of one RIC cycle and the RIC interval are approximately 2 μs and 14 μs, respectively. Therefore, a 10 μs wide window centered within the RIC interval spans 5 cycles of the RIC signal.

If a RIC signal exists and the slicing level is set such that the RIC signal transitions cross the slicing level, five RIC pulses will occur on signal DSOUT during the window W1 interval. It is extremely unlikely that a random signal will produce exactly five pulses on signal DSOUT during a window interval W1 that is timed as shown in FIG. 3. Thus, if five pulses are counted on signal DSOUT during the W1 window, the RIC signal and auxiliary video data may be assumed to have been detected.

Figure 4:
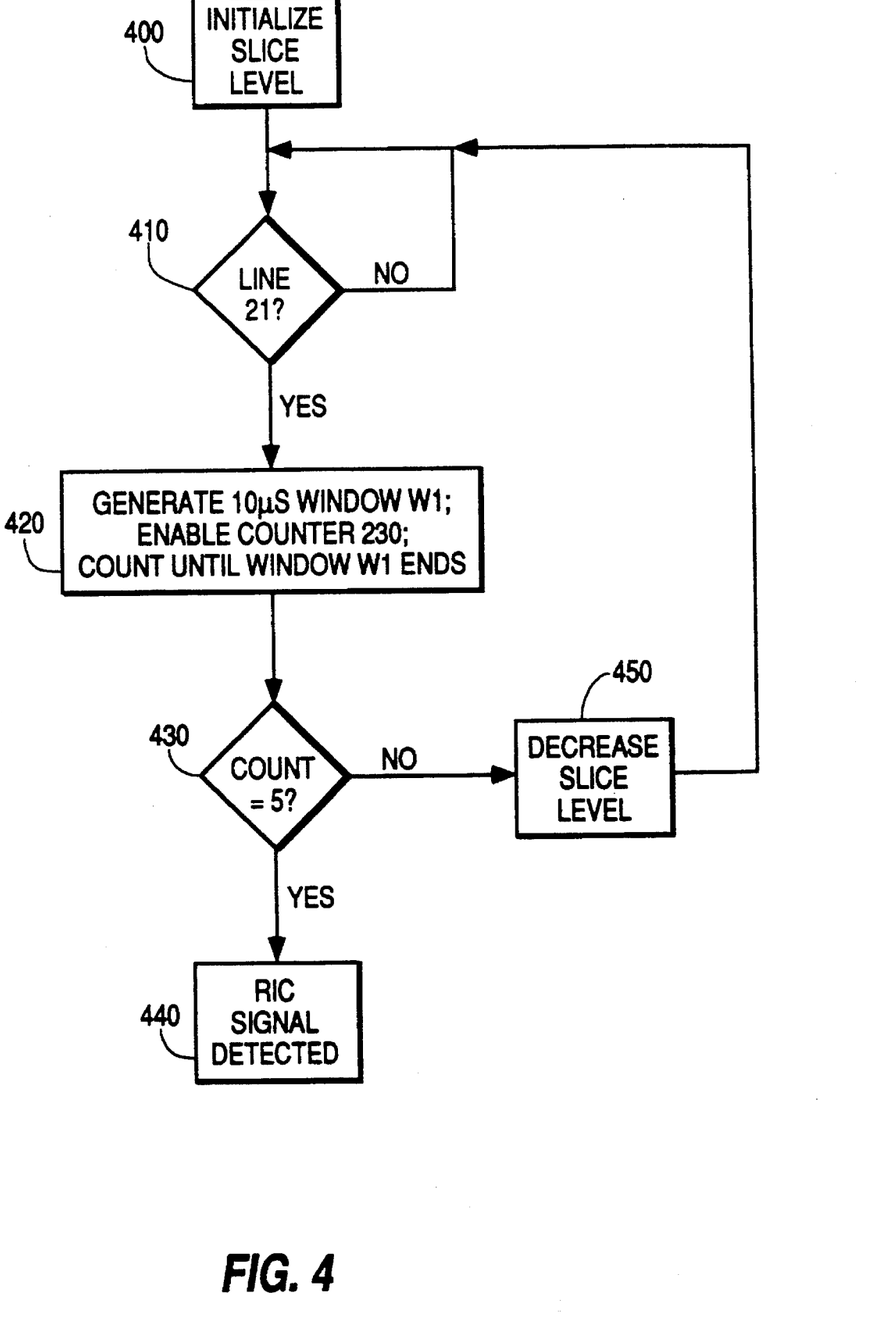
FIGS. 4 and 5 show flowcharts useful for understanding the operation of the embodiment in FIG. 2.

Counter 230 operates to count pulses on signal DSOUT during the W1 window interval (step 420 in FIG. 4). Counter 230 is enabled when control logic 290 causes signal PRECLR to go logic 0. Control logic 290 also forces signal RUNINW to logic 1 to enable pulses on signal DSOUT to clock counter 230 via NAND gate 270. Signal RUNINW remains at logic 1 until the end of the 10 μs period of window W1. When control logic 290 forces signal RUNINW to logic 0 at the end of window W1, the clock to counter 230 is disabled and counting stops.

The count value in counter 230 is then tested by the control μC at step 430. If the count value is five, the RIC has been detected and more precise slicing level adjustment may proceed as described below. If the count is not five, slicing level DSBV is decreased by the control μC decreasing the digital input to DAC 200 (step 450). The counting test is then repeated by a return to step 410. The described operations are repeated until a count of five is detected.

Figure 5:
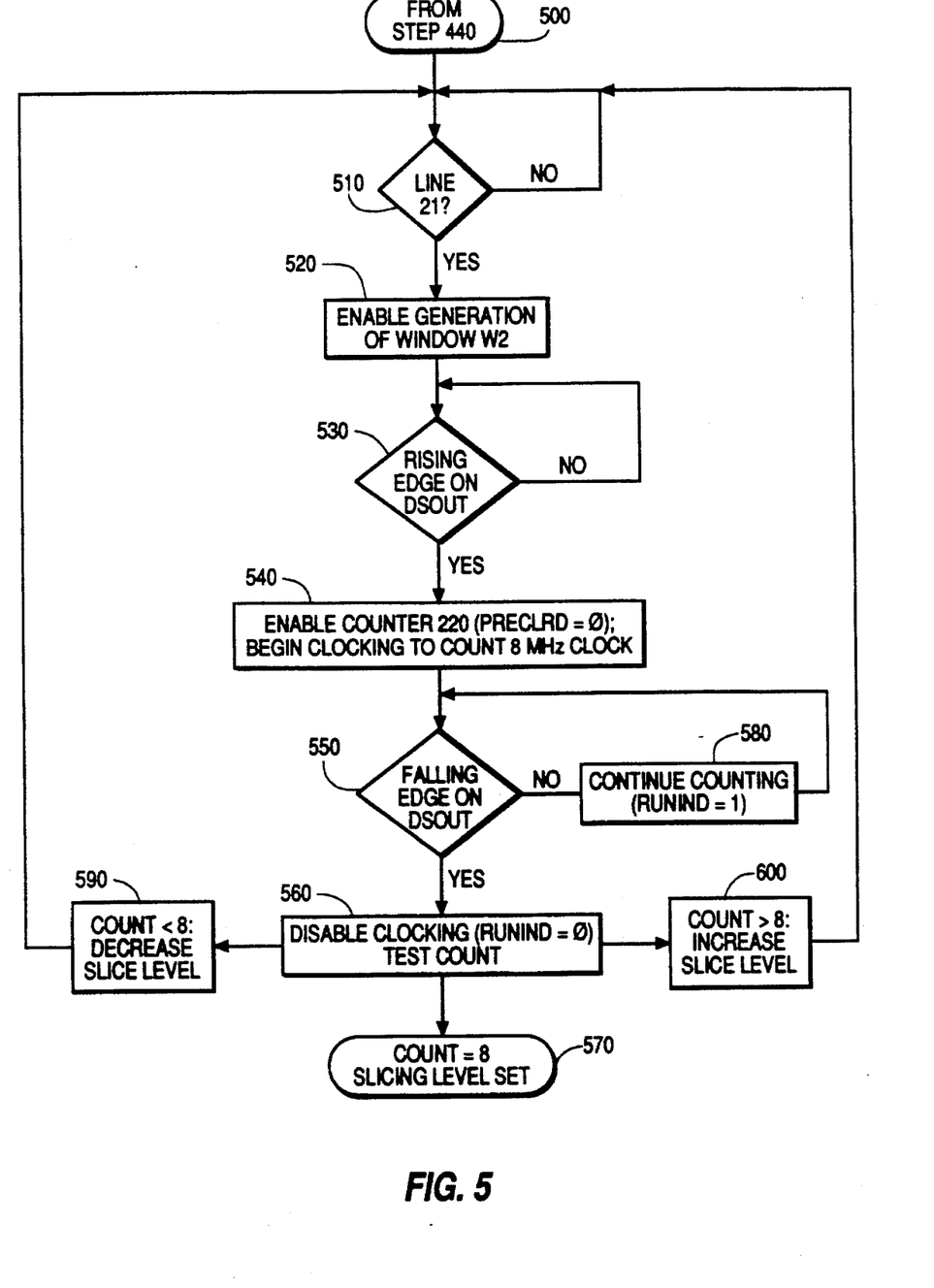

After successful completion of the routine in FIG. 4, the control μC executes a routine shown in the flowchart of FIG. 5 to more precisely adjust slicing level DSBV to a desired level, e.g. 25 IRE for a 50 IRE amplitude auxiliary video data signal. The routine in FIG. 5 involves determining the duty cycle of the waveform on signal DSOUT during the RIC window W1.

Figures 3A, 3B:
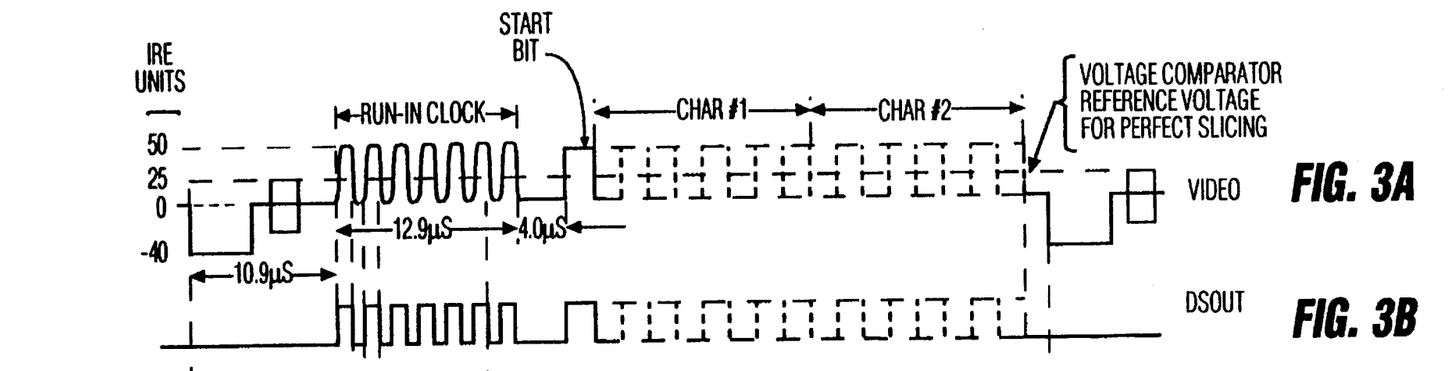
FIG. 3 shows signal waveforms useful for understanding the operation of the embodiment in FIG. 2.
Figure 3C:
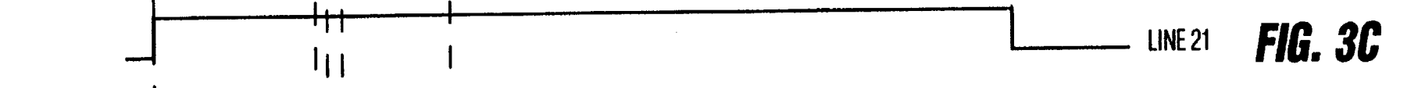
Figure 3D:
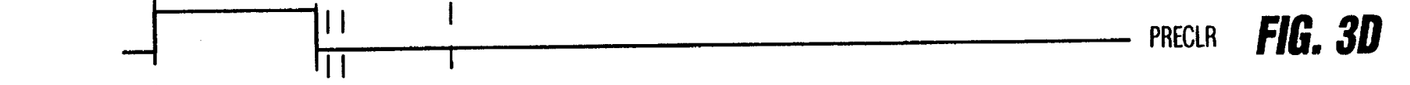
Figure 3E:
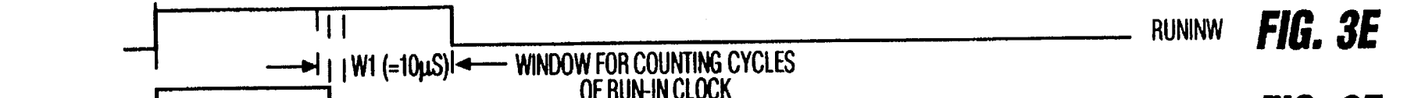
Figure 3F:
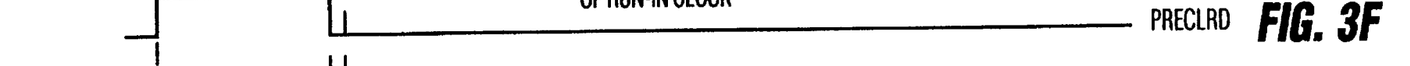
Figure 3G:
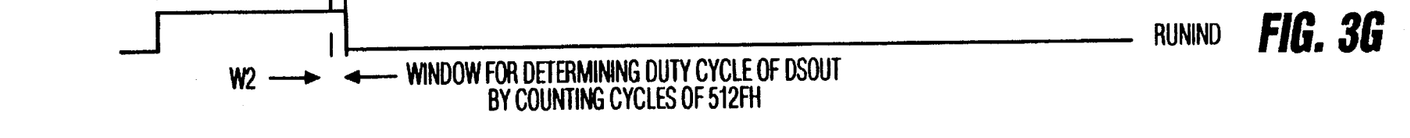

At the start of line 21 (step 510 in FIG. 5), control signal PRECLR is set to logic 1 by control logic 290 to clear D type flip flops (DFF) 250 and 260. When cleared by signal PRECLR, the inverted outputs (QNOT) of DFF 250 and 260, signals RUNIND and PRECLRD respectively, are at logic 1 as shown in waveforms F and G of FIG. 3. The described state of signals PRECLRD and RUNIND enables the generation of a window W2 (step 520) when signal PRECLR goes to logic 0. As shown in FIG. 3G, window W2 represents the duration of a single period within Window W1 when the RIC signal exceeds the slicing level. Window W2 is used as described below to determine the duty cycle of the pulse waveform on signal DSOUT corresponding to the RIC signal.

Window W2 is generated in the following manner. After control logic 290 causes signal PRECLR to go to logic 0 (see FIG. 3D), DFF 250 and 260 are enabled for clocking by transitions on signal DSOUT. A rising transition (logic 0 to logic 1) will clock DFF 260 and, because of inverter 280, a falling transition will clock DFF 250. In FIG. 2, the D input of DFF 260 is fixed at logic 1. As a result, the first rising transition on signal DSOUT after signal PRECLR goes to logic 0 will cause the true (Q) and inverted (QNOT) outputs of DFF 260 (Q) to go to logic 1 and logic 0, respectively. Thus, as shown in FIG. 3F, signal PRECLRD at the QNOT output of DFF 260 will go to logic 0 to begin window W2 in response to the first rising edge. The system waits at step 530 until this first rising edge on signal DSOUT occurs.

With the Q output of DFF 260 coupled to the D input of DFF 250 as shown in FIG. 2, the first falling edge on signal DSOUT after signal PRECLRD transitions to logic 0 causes signal RUNIND at the QNOT output of DFF 250 to go to logic zero. The transition of signal RUNIND to logic 0 indicates the end of window W2 as shown in FIG. 3G. The system checks for the end of window W2 at step 550.

Counter 220 is enabled for counting during window W2 because the reset input of counter 220 is coupled to signal PRECLRD which is at logic 0 during window W2. Clocking for counter 220 is provided by the output of NAND gate 240 which is the logical AND of signal CLOCK and signal RUNIND. Thus, a clock signal will be provided to counter 220 when signal RUNIND is at logic 1. Signal RUNIND going to logic 0 at the end of window W2 will gate off the clock signal to counter 220. As a result, counter 220 is enabled for counting and will be clocked during window W2 when signals PRECLRD and RUNIND are at logic 0 and 1, respectively. Thus, the count value produced will represent the number of cycles of signal CLOCK that occur during window W2. The enabling of counter 220 and the counting sequence is represented by steps 540, 550, and 580 in FIG. 5.

As explained above, window W2 occurs within window W1 and represents single interval during which the RIC signal exceeds the slicing level. Also discussed previously, a desirable value for slicing level DSBV is the average value of the RIC signal amplitude. For a RIC signal having a period of 2 μs (such as the RIC signal associated with closed caption data), setting slicing level DSBV to the average of the RIC amplitude will cause the RIC waveform to be greater than and less than slicing level DSBV for equal intervals of 1 μs. As a result, signal DSOUT will be high and low for 1 μs causing the duration of window W2 to also be 1 μs.

Because counter 220 counts cycles of signal CLOCK only during window W2, the count value produced by counter 220 will represent the duration of the period that signal RIC exceeds slicing level DSBV. If signal CLOCK is, for example, an approximately 8 MHz signal (e.g. 512 times the horizontal frequency FH) 8 cycles of signal CLOCK will be counted during the window W2 interval of 1 μs that indicates slicing level DSBV is at the desired value. If slicing level DSBV is increased, signal RIC will exceed the slicing level for a shorter interval, the width of window W2 will decrease, and the count accumulated in counter 220 will decrease. Similarly, decreasing the slicing level will increase the duration of window W2 and increase the count value in counter 220. Therefore, adjusting slicing level DSBV until a count of 8 is accumulated in COUNTER 220 will set the slicing level at the desired value. The steps involved in testing the count value in counter 220 and adjusting the slicing level accordingly are depicted by steps 560, 570, 590, and 600 in FIG. 5.

The described approach takes advantage of the fact that the RIC signal is a sinewave causing the pulse waveform on signal DSOUT at the output of the voltage comparator to have a duty cycle which is a function of the slicing level DSBV. The duty cycle of signal DSOUT is 50% when the slicing level has been set to the average of the peak-to-peak amplitude of the sinusoidal RIC signal.

An alternative approach to finding the correct value for slicing level DSBV is for the control μC to sweep slicing level DSBV through its full range and record the limit values of the range where a count of 5 is accumulated by counter 220. The limit values would represent the positive and negative peak values of the RIC signal. Setting the slicing level at a value half way between the lower and upper limit values would position the slicing level at the average of the RIC amplitude. This method eliminates the duty cycle measurement with COUNTER 220 and may make it possible to establish the slicing level more quickly. flowever, if the voltage levels of the input video signal are not stable, the duty cycle measurement may be desirable to provide improved slicing level accuracy.

At least the following advantages are provided by the described adaptive slicing level system. First, the video signal is directly coupled to the input of the voltage comparator. This eliminates the need for a large and expensive coupling capacitor that may be required in other types of data slicers. The size of the capacitor may preclude including it in an integrated circuit implementation of the data slicer.

In addition, time constants associated with a coupling capacitor may require an undesirably long interval for adjusting the slicing level. If the signal amplitude changes significantly (e.g. following a change to a new video signal source) and a substantial change in slicing level is required, a long slicing level adjustment interval may cause loss of auxiliary video data. The described invention makes it possible to rapidly set the slicing level to the desired value. For example, with the 6 bit D/A converter this is done over a period of 6 frames (about ⅕ of a second) by using the "binary chop" method of successive approximation.

Also, the invention provides a dependable and quick method via use of counter 230 for deciding whether an auxiliary video signal is present. In the case of closed caption data, for example, this feature is important in situations where identification of line 21 may be difficult. Under certain conditions, a search over a limited range of lines in the immediate vicinity of where line 21 is expected to be may be necessary. Incorporating the operation of counter 230 into the searching procedure aids in identifying line 21.

Although the invention has been described in the context of closed caption data, the invention is also applicable to other forms of auxiliary video data, e.g. teletext. In the case of other forms of data, the system may require certain modifications. For example, the teletext standard permits teletext data to appear on a number of video lines, e.g. lines 17 to 20. Thus, for a teletext system, means for locating the auxiliary video data other than a line counter may be desirable.

The operation of the disclosed system may be modified in other ways to accommodate alternative auxiliary data formats. As an example, if the format of the reference signal (RIC signal in the described embodiment) changes, the disclosed hardware or software can easily be changed to operate correctly with the data format variations. Modifications of this type may include adapting the system for reference signals having characteristics (e.g. amplitude, waveform, frequency) that differ from the described exemplary RIC signal.

Other modifications of the invention may also be evident to one skilled in the art. For example, hardware may be used to implement functions, e.g. control functions, that are described above and shown in FIG. 3 as being performed by execution of software in a control µC.

These and other modifications are intended to be within the scope of the invention.

What is claimed is:

1. In a system for processing a video signal, said video signal including an auxiliary information signal component having a reference signal component and a data signal component, said reference signal component varying periodically at a predetermined frequency, apparatus comprising:

comparator means having a first input coupled to said video signal for receiving said reference signal component and producing an output signal having one of first and second values, said output signal having said first value when said video signal exceeds a threshold level at a second input and said output signal having said second value when said video signal is less than said threshold level at said second input;

means responsive to said output signal for producing a control signal having a value representative of the duty cycle of said output signal, said control signal producing means being enabled for modifying said control signal value when said output signal has said first value and being disabled to prevent modifying said control signal value when said output signal has said second value; and means for modifying the magnitude of said threshold level at said second input of said comparator means in response to said control signal to produce an output signal having a predetermined duty cycle.

2. The apparatus of claim 1, wherein said control signal producing means comprises:

means for counting cycles of an input clock signal at a predetermined frequency related to a frequency of said periodic variations of said reference component to produce a count representative of said duty cycle of said output signal; wherein said counting means being enabled for counting when said output signal has said first value and being disabled to prevent counting when said output signal has said second value.

3. The apparatus of claim 2, wherein said threshold level modifying means comprises:

means for evaluating said count to determine if said duty cycle of said output signal differs from said predetermined duty cycle, and for producing a signal representative of a modified threshold level; and means responsive to said representative signal for adjusting said threshold level to said modified threshold level, said modified threshold level tending to cause said output signal to exhibit said predetermined duty cycle in response to said reference signal component.

4. The apparatus of claim 1, wherein said predetermined duty cycle is a substantially fifty percent duty cycle.

5. The apparatus of claim 1, wherein said threshold modifying means comprises:

means responsive to said control signal for producing a signal representative of a desired value of said threshold level; and means for coupling said representative signal to said second input of said comparator means to produce said desired threshold level.

6. The apparatus of claim 5, wherein said representative signal producing means comprises a microprocessor, said representative signal comprises a digital signal, and said means for coupling said representative signal comprises a digital-to-analog converter.

7. In a system for processing a video signal, said video signal including a plurality of periodic horizontal line intervals and tending to have an auxiliary information signal component occurring during at least one of said horizontal line intervals, said auxiliary information signal component having a reference signal component and a data signal component, said reference signal component varying periodically at a predetermined frequency, apparatus comprising:

comparator means having a first input coupled to said video signal for producing an output signal having one of first and second values, said output signal having said first value when said video signal exceeds a threshold level at a second input and said output signal having said second value when said video signal is less than said threshold level at said second input;

means responsive to said output signal and to a synchronizing signal indicating the occurrence of said horizontal line intervals that may contain said auxiliary information signal component for producing a first control signal indicating whether said auxiliary information signal component is present during at least one of said horizontal line intervals that may contain said auxiliary information component;

means responsive to said output signal for producing a second control signal having a value representative of a duty cycle of said output signal, said second control signal producing means being enabled for modifying said second control signal value when said output signal has said first value and being disabled to prevent modifying said second control signal value when said output signal has said second value; and means responsive to said first and second control signals for modifying the magnitude of said threshold level at said second input of said comparator means to produce an output signal having a predetermined duty cycle.

8. The apparatus of claim 7, wherein said second control signal producing means comprises:

means for counting cycles of an input clock signal at a predetermined frequency related to a frequency of said periodic variations of said reference component to produce a count representative of said duty cycle of said output signal;

said counting means being enabled for counting when said output signal has said first value and being disabled to prevent counting when said output signal has said second value.

9. The apparatus of claim 8, wherein said threshold modifying means comprises:

means for evaluating said count to determine if said duty cycle of said output signal differs from said predetermined duty cycle, and for producing a signal representative of a modified threshold level; and means responsive to said representative signal for adjusting said threshold level to said modified threshold level, said modified threshold level tending to cause said output signal to exhibit said predetermined duty cycle in response to said reference signal components.

10. The apparatus of claim 9, wherein said evaluating means comprises a microprocessor, said representative signal comprises a digital signal, and said threshold adjusting means comprises a digital-to-analog converter.

11. The apparatus of claim 7, wherein:

said first control signal producing means comprises a first counter for counting variations of said output signal that occur during a second interval to produce a first count, said second interval spanning at least a portion of said reference component if said auxiliary information component is present; and said second control signal producing means comprises a second counter for counting cycles of an input clock signal at a predetermined frequency related to a frequency of said periodic variations of said reference component to produce a second count representative of said duty cycle of said output signal, said second counter counting only during said interval when said output signal exhibits only said first value in response to said reference signal component.

12. In a system for processing a video signal including a reference signal component varying periodically at a predetermined frequency, apparatus comprising:

means for comparing said reference signal component to a threshold level to produce an output signal exhibiting a first state when said reference signal component exhibits a first predetermined relationship to said threshold level, and exhibiting a second state when said reference signal component exhibits a second predetermined relationship to said threshold level;

means responsive to said output signal for producing a control signal having a value representative of a duty cycle of said output signal, said control signal producing means being enabled for modifying said control signal value when said output signal exhibits said first state and being disabled to prevent modifying said control signal value when said output signal exhibits said second state; and means responsive to said control signal for modifying the magnitude of said threshold level in a direction to cause said output signal to have a predetermined duty cycle.

13. The apparatus of claim 12, wherein said control signal producing means comprises:

means for counting cycles of an input clock signal at a predetermined frequency greater than a frequency of said periodic variations of said reference signal component to produce a count representative of said duty cycle of said output signal; wherein said counting means counts only when said output signal exhibits said first state in response to said reference signal component.

14. The apparatus of claim 13, wherein said threshold level modifying means comprises:

means for evaluating said count to determine if said duty cycle of said output signal differs from said predetermined duty cycle; and means for adjusting said threshold level to cause said output signal to exhibit said predetermined duty cycle.

15. The apparatus of claim 13 further comprising means responsive to said output signal for generating a second control signal indicating when said video signal includes said reference signal component; wherein said threshold level modifying means is responsive to said second control signal for modifying said threshold level only when said video signal includes said reference signal component.

16. The apparatus of claim 15 wherein said means for producing said second control signal comprises means for counting transitions of said output signal that cross said threshold level during an interval of said video signal when said reference signal component is expected to occur.

17. In a system for processing a video signal, said video signal including a plurality of periodic horizontal line intervals and tending to have an auxiliary information signal component occurring during at least one of said horizontal line intervals, said auxiliary information signal component having a reference signal component and a data signal component, said reference signal component varying periodically at a predetermined frequency, apparatus comprising:

comparator means having a first input coupled to said video signal for producing an output signal having one of first and second values, said output signal having said first value when said video signal exceeds a threshold level at a second input and said output signal having said second value when said video signal is less than said threshold level at said second input;

means responsive to said output signal and to a synchronizing signal indicating the occurrence of said horizontal line intervals that may contain said auxiliary information signal component for producing a first control signal indicating whether said auxiliary information signal component is present during at least one of said horizontal line intervals that may contain said auxiliary information component;

means responsive to said output signal and operative during an interval when said output signal exhibits only said first value in response to said reference signal component for producing a second control signal indicating a duty cycle of said output signal; and means responsive to said first and second control signals for modifying the magnitude of said threshold level at said second input of said comparator means to produce an output signal having a predetermined duty cycle; wherein said second control signal producing means comprises:

means for counting cycles of an input clock signal at a predetermined frequency related to a frequency of said periodic variations of said reference component to produce a count representative of said duty cycle of said output signal, said counting means counting during said interval when said output signal exhibits only said first value in response to said reference signal component; and wherein said threshold modifying means comprises:

means for evaluating said count to determine a difference between said duty cycle of said output signal and said predetermined duty cycle, and for producing a signal representative of said difference; and means for coupling said representative signal to said second input of said comparator means to modify said threshold level in a direction to decrease said difference.

18. The apparatus of claim 17, wherein:

said first control signal producing means comprises a first counter for counting variations of said output signal that occur during a second interval to produce a first count, said second interval spanning at least a portion of said reference component if said auxiliary information component is present; and said second control signal producing means comprises a second counter for counting cycles of an input clock signal at a predetermined frequency related to a frequency of said periodic variations of said reference component to produce a second count representative of said duty cycle of said output signal, said second counter counting during said interval when said output signal exhibits only said first value in response to said reference signal component.

19. In a system for processing a video signal including an auxiliary information signal component having a reference signal component varying periodically at a predetermined frequency, apparatus comprising:

means coupled to receive said video signal for comparing said video signal to a threshold level to produce an output signal having first and second states, said output signal exhibiting said first state when said video signal exhibits a predetermined relationship to said threshold level;

means operative only when said output signal exhibits said first state in response to said reference signal component for producing a control signal representative of a duty cycle of said output signal; and means responsive to said control signal for modifying the magnitude of said threshold level in a direction to cause said output signal to have a predetermined duty cycle; wherein said control signal producing means comprises means for counting cycles of an input clock signal at a predetermined frequency greater than a frequency of said periodic variations of said reference component to produce a count representative of said duty cycle of said output signal, said counting means counting only when said output signal exhibits said first state in response to said reference signal component; and wherein said threshold level modifying means comprises:

means for evaluating said count to determine if said duty cycle of said output signal differs from said predetermined duty cycle; and means for adjusting said threshold level to cause said output signal to exhibit said predetermined duty cycle.

20. In a system for processing a video signal including a reference signal component comprising a period of a periodically varying amplitude characteristic, apparatus comprising:

means for comparing said reference signal component to a threshold level to produce an output signal having a first value when said reference signal component exhibits a first predetermined relationship to said threshold level, and having a second value when said reference signal component exhibits a second predetermined relationship to said threshold level;

means for defining an enable interval corresponding to a portion of said period of said periodically varying amplitude characteristic, said output signal exhibiting said first value during said enable interval;

means for producing a control signal having a value representative of a duty cycle of said output signal; said control signal producing means being enabled for modifying said control signal value only during said enable interval; and means responsive to said control signal for modifying the magnitude of said threshold level in a direction to cause said output signal to have a predetermined duty cycle.

* * * * *